(12) United States Patent
LaBarge, III

(10) Patent No.: US 8,025,577 B2
(45) Date of Patent: Sep. 27, 2011

(54) COUPLING GUARD

(76) Inventor: William E. LaBarge, III, Grandville, MI (US)

( * ) Notice: Subject to any disclaimer, the term of this patent is extended or adjusted under 35 U.S.C. 154(b) by 309 days.

(21) Appl. No.: 12/405,652

(22) Filed: Mar. 17, 2009

(65) Prior Publication Data

US 2009/0264209 A1 Oct. 22, 2009

Related U.S. Application Data

(60) Provisional application No. 61/045,384, filed on Apr. 16, 2008.

(51) Int. Cl.
 *F16D 3/84* (2006.01)
(52) U.S. Cl. .................................. 464/172; 248/124.1
(58) Field of Classification Search .................. 464/172, 464/177; 285/302; 74/609; 248/124.1
See application file for complete search history.

(56) References Cited

U.S. PATENT DOCUMENTS

| 1,455,899 | A | * | 5/1923 | Cabelinsky ............... 464/172 X |
| 2,775,905 | A | | 1/1957 | Jackson |
| 3,904,379 | A | * | 9/1975 | Oser et al. ................. 285/302 X |
| 4,073,591 | A | | 2/1978 | Heitzman et al. |
| D250,119 | S | | 10/1978 | Qualis |
| 4,324,533 | A | | 4/1982 | Schroeder et al. |
| 4,848,409 | A | | 7/1989 | Jahnke, Jr. |
| 5,199,926 | A | | 4/1993 | Hennig et al. |
| 5,711,710 | A | | 1/1998 | Brisk |
| 6,190,261 | B1 | | 2/2001 | Powell |
| 6,241,618 | B1 | | 6/2001 | Doll |
| 7,275,995 | B2 | | 10/2007 | Doll |
| 7,520,816 | B1 | * | 4/2009 | Brisk ............................ 464/172 |

FOREIGN PATENT DOCUMENTS

GB 2 045 884 A * 11/1980 ..................... 464/172

OTHER PUBLICATIONS

Orange Peel Rotating Shaft Guards Brochure, copyright 2003, 2006 Rexnord Industries, LLC.

* cited by examiner

*Primary Examiner* — Gregory Binda
(74) *Attorney, Agent, or Firm* — Price Heneveld LLP

(57) ABSTRACT

A guard for shielding a coupling joint joining rotating shafts includes first and second cylindrical components configured to telescopingly adjustably engage to enclose the coupling joint. The cylindrical components are made from opposing identical semi-cylindrical cover halves, each with lateral flanges, with one set of lateral flanges forming an inwardly-facing longitudinal slot for slidably receiving the other pair of lateral flanges. A fastener extended through overlapping flanges fixes the length adjustment. A pair of supports includes a vertically adjustable bracket on spaced stands, the brackets being configured to wedgingly engage the supports when secured in a vertically adjusted position thereon. The cover halves, supports and brackets can be thermoformed from heat.

8 Claims, 2 Drawing Sheets

COUPLING GUARD

This application claims benefit under 35 U.S. C. §119(e) of provisional application Ser. No. 61/045,384, filed Apr. 16, 2008, entitled COUPLING GUARD, the entire contents of which are incorporated herein.

BACKGROUND

The present invention relates to guards for covering coupling joints that connect rotating shafts on machinery.

Guards are often used to cover coupling joints in order to prevent accidental contact with fast rotating coupling joints, such as for covering coupling joints connecting motors to machinery for power transmissions. Further, many standards require guards, such as standards by OSHA, ASME and ANSI organizations. However, guards must not only prevent accidental contact, they also must be quickly removable to allow efficient repair. Also, guards must preferably be low cost for competitive reasons. Another problem is that complex guards and/or difficult-to-install guards are soon removed from (or left off from) machinery because maintenance personnel and workers get tired of trying to work around them. One practical reason that guards become complex or expensive is because of the tendency to custom manufacture guards for each application, due to the variations and special circumstances encountered at each installation. At the same time, it is difficult to make a guard flexible enough to satisfy a variety of different physical environments, yet that is cost competitive, meets industry safety standards, and that can accommodate most variations seen at a job site.

SUMMARY OF THE PRESENT INVENTION

The present guard is adapted to encompass a coupling joint, but is adjustable in height and length to accommodate height and length variations of couplings often seen on job sites. Further, it includes relatively few major components, several of which are duplicates, thus reducing complexity and providing an arrangement that is intuitive to assemble and relatively easy to install or remove. Further, the components are relatively simply-shaped parts which can be made by lower-cost and lower-volume manufacturing methods, such as vacuum forming of a heated sheet yet which wedgingly engage to provide a very stable assembly when installed/assembled.

In one aspect of the present invention, a guard is provided for shielding a pair of exposed rotating shafts and a coupling joint interconnecting the shafts in a machine assembly. The guard includes first, second, third, and fourth cover components, each including a semi-circular body and an end wall and edges on opposing sides. The bodies of the first and second cover components form a first cylindrical shape, and the associated end walls form a first opening for a first shaft when the edges of the first and second cover components are abutted. The bodies of the third and fourth cover components form a second cylindrical shape and the associated end walls form a second opening for a second shaft when the edges of the third and fourth cover components are abutted. The first cylindrical shape is sized to telescopingly slide over an outer surface of the second cylindrical shape in order to enclose the coupling joint and associated portions of the first and second shafts.

In a narrower form, the lateral flanges of the first and second cover components define inwardly-open longitudinal slots for telescopingly slidingly receiving the lateral flanges of the third and fourth covers to thus allow for longitudinal length adjustment of the guard, with the lateral flanges of the first, second, third, and fourth cover components having different lengths of overlapping portions when adjusted.

Also in a narrower form, at least one fastener is extended through the overlapped portions of the lateral flanges to fix an adjusted length of the guard.

In another aspect of the present invention, a guard is provided for shielding a pair of exposed rotating shafts and a coupling joint interconnecting the shafts in a machine assembly. The guard includes first and second cylindrical components configured to telescopingly engage to enclose a coupling joint and each including an end wall forming an opening for a shaft, the components slidingly engaging to thus allow for longitudinal length adjustment of the guard. The guard further includes a pair of spaced supports, and a vertically adjustable bracket on each of the pair of supports, the bracket being configured to wedgingly engage the supports when secured in a vertically adjusted position thereon.

In another aspect of the present invention, a method of providing a guard for shielding a pair of exposed rotating shafts and a coupling joint interconnecting the shafts in a machine assembly, comprises steps of providing first and second cylindrical components that enclose the coupling joint and that form end walls with openings for the shafts, slidingly engaging the first and second cylindrical components to adjust to a selected longitudinal length for covering the coupling joint and then securing same together. Further, the method includes providing a pair of supports including a vertically adjustable bracket on each of the pair of supports, and adjusting and then wedgingly securing the brackets to the supports in a vertically adjusted position thereon.

In another aspect of the present invention, a method includes providing first and second cylindrical components configured to telescopingly engage to enclose a coupling joint and each including an end wall forming an opening for a shaft, the first and second cylindrical components having first abutting lateral flanges that form longitudinally-extending slots and second abutting lateral flanges that fit into and slidably engage the slots. The method further includes providing supports for supporting the first and second cylindrical components, and slidingly longitudinally adjusting and then securing the first and second cylindrical components together in a horizontally adjusted position and to the supports.

An object of the present invention is to provide a coupling guard that covers all sides of a power coupling, and that is telescopingly adjustable in length and also adjustable in height.

An object of the present invention is to provide a coupling guard that covers all sides of a power coupling, and that includes first and second telescoping cylindrical portions each with overlapping lateral flanges, the lateral flanges on one slidingly engaging the lateral flanges of the other, thus providing longitudinally telescoping adjustment, and also including at least one fastener extending through the overlapping flanges to fix a selected telescopingly adjusted length of the assembly.

Another object of the present invention is to provide a coupling guard made from four housing pieces bolted together using overlapping flanges, and supported by four support pieces for height adjustment. In a narrower form, the four housing pieces include two pairs of identical housing-defining pieces, and the four support pieces include two pairs of identical support-defining pieces.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1A:
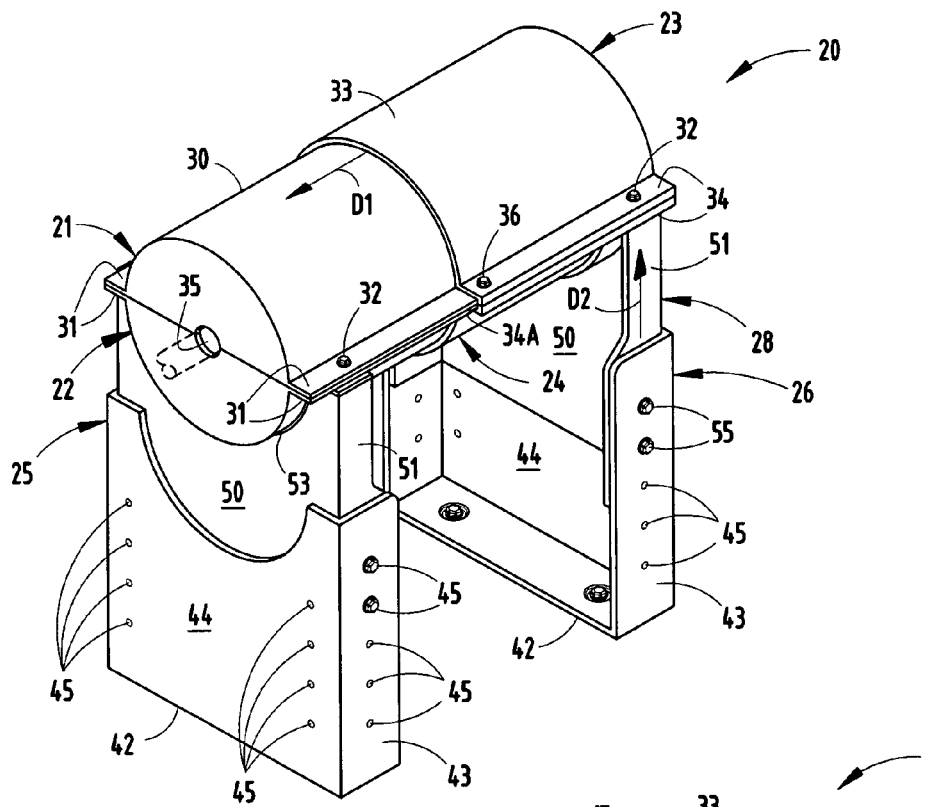
FIG. 1A is a top perspective view of the guard of FIG. 1.
Figure 1:
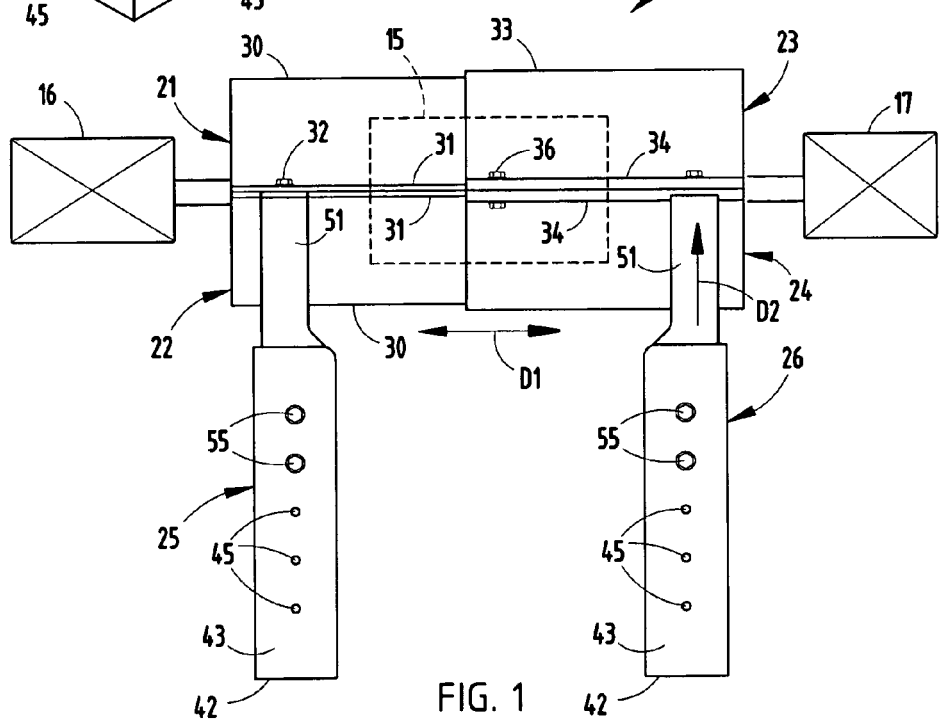
FIG. 1 is a side view of the present guard installed to cover a rotating coupling joint between a motor and a pump.
Figure 2:
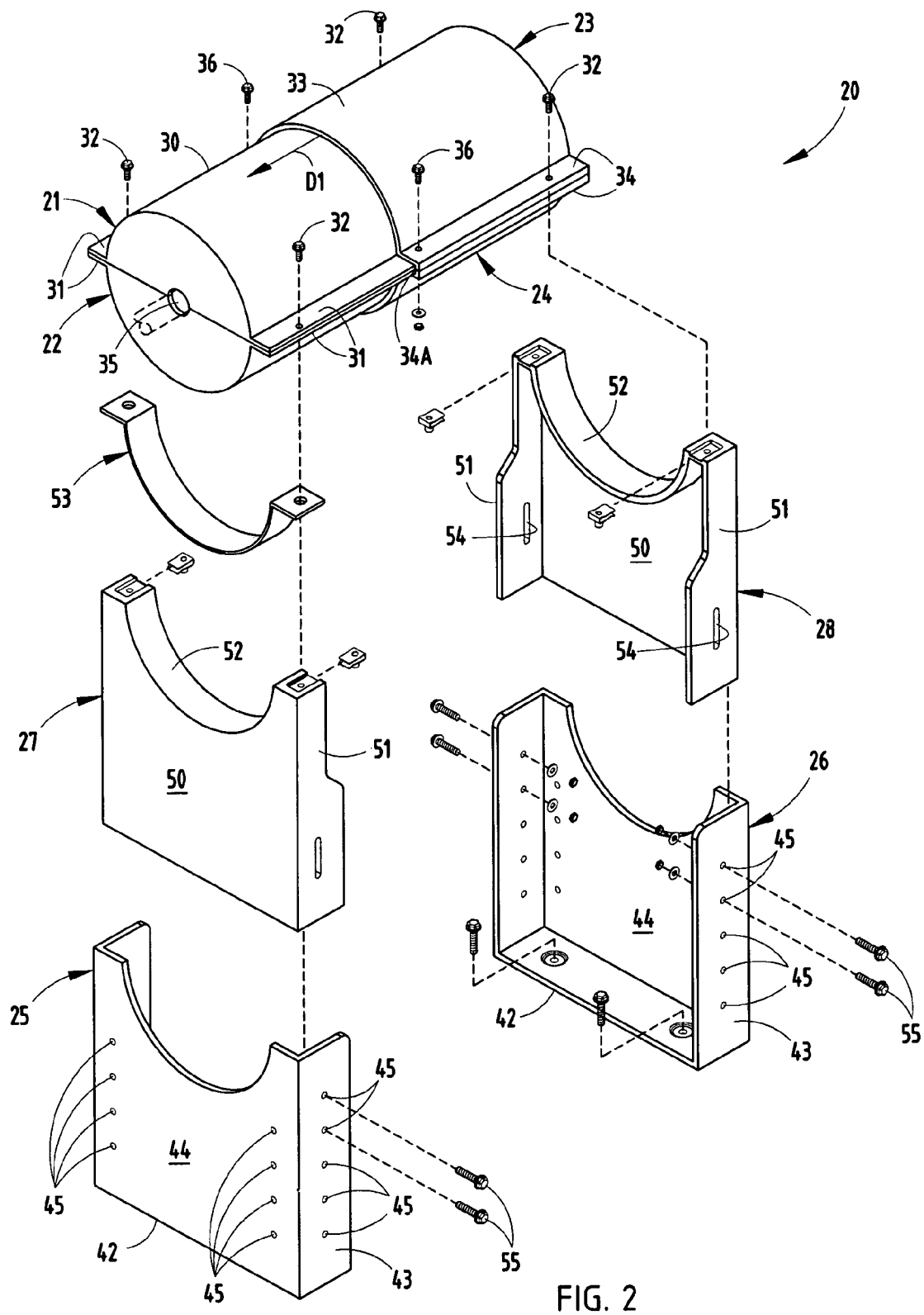
FIG. 2 is an exploded perspective view of the guard of FIG. 1.

A guard assembly 20 (FIGS. 1-2) is provided for covering a rotating power coupling joint 15 such as for transmitting power between the shaft of a motor 16 and the shaft of a pump or gear box 17. The guard assembly 20 includes a first pair of opposing clamshell covers 21/22, a second pair of opposing clamshell covers 23/24, a pair of main supports 25/26, and a pair of adjustable brackets 27/28. The covers 21/22 are identical in shape and include bodies 30 defining a semi-cylindrical chamber and lateral flanges 31. When positioned together, the lateral flanges 31 abut on each side, and their bodies 30 define a cylindrical housing with a relatively small opening 35 for the shaft at one end and an oppositely-facing large open end. Flanges 31 are attached together along overlapping portions, such as by screws or bolts 32. The covers 23/24 are also identical in shape and include bodies 33 defining a semi-cylindrical chamber and lateral flanges 34. When positioned together, their lateral flanges 34 abut on each side, and their bodies 33 define a cylindrical housing with a small opening 35 at one end for receiving a shaft and an oppositely-facing enlarged open end. Flanges 34 are attached together along overlapping portions, such as by screws or bolts 32.

The abutting flanges 34 define therebetween a longitudinal pocket or slot (starting at location 34A) for longitudinally telescopingly receiving the abutting flanges 31. The combined bodies 30 of covers 21/22 are shaped to telescope into the combined bodies 33 of covers 23/24 (i.e., their enlarged open ends matingly slidingly telescopingly engage). Both covers 21/22 and also covers 23/24 have one-directionally "open" surfaces (i.e., there are no undercuts that would cause a die-lock). The open surfaces allow the parts to be made by heating a sheet of constant thickness and forming the sheet by thermoforming, often called vacuum forming. Nonetheless, it is contemplated that they could also be made by injection molding, rotational molding, compression molding, etc. . . . or can be stamped from metal.

Once assembled, the covers 21/22 as a unit can be telescoped in a direction D1 to a selected depth in the covers 23/24, thus setting a total length of the assembly. A screw or bolt 36 is then run through the overlapping flanges 31/34 on each side to secure the selected telescoped position. When assembled, the covers 21/22 and also the covers 23/24 define an open center hole for receiving the shafts of the motor 16 and pump 17, with the coupling 15 positioned in the housings between the covers 21/22, 23/24. The covers 21/24, their telescoping relation, and their bolted overlapping flanges are believed to be novel and patentable, since the arrangement allows telescoping adjustment, simple components, vacuum molded components, and simple fixing of the adjusted length (which can be important since the length of couplings between a motor and a pump can be different for different set-ups, making every one a "custom job").

Spaced-apart stands are constructed using supports 25/26 and brackets 27/28 for supporting the assembly of covers 21/24. The main supports 25/26 are also identical in shape, can be vacuum formed, are simple and low cost, yet very stable, durable, and robust. The main supports 25/26 each include a bottom wall 42, opposing side walls 43, and end wall 44 with a U-shaped horizontal cross section that defines a laterally-facing pocket. A vertical column of holes 45 are formed preferably in the end wall 44 . . . but can be in the side walls 43, if desired.

The adjustable brackets 27/28 are also identical in shape, can be vacuum formed, are simple and low cost, yet very stable, durable, and robust. The brackets 27/28 each include an end wall 50, side walls 51, and a top wall 52 with a U-shaped horizontal cross section that defines a laterally-facing pocket. The top wall 52 is shaped to mate against and support the lower larger cover 23 (at one end). At the other end, a shim 53 fits onto the top wall 52, allowing it to support the smaller cover 21 (at the other end). The side walls 51 include a slot 54. When assembled, the side walls 51 of the brackets 27/28 fit tightly into and between the side walls 43 of the main supports 25/26 and can be telescopingly slidingly adjusted to a selected height. A bolt 55 extends through the slots 54 on each side and through a selected hole 45 to fix the height in the adjusted position. The draft angle of the side walls 51 and 43 (i.e., the angle required to facilitate vacuum molding the parts, which angle is formed relative to a die-closure and horizontal/longitudinal direction) causes the side walls 51 and 43 to wedgingly frictionally engage as the bolts are tightened, which further adds strength and stability of the assembly.

As a result of the above, a low cost, durable, robust, and sturdy coupling guard can be made that is longitudinally telescopingly adjustable and that is vertically adjustable in height . . . yet with few components and low cost and easy install/removability. Notably, vacuum forming allows low production volumes at competitive cost. Higher volume parts could be made using the present concepts but with production processes more suited for higher volumes.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A guard for shielding a pair of exposed rotating shafts and a coupling joint interconnecting the shafts in a machine assembly, comprising:

first, second, third, and fourth cover components, each including a semi-circular body and an end wall and edges on opposing sides; the bodies of the first and second cover components forming a first cylindrical shape and the associated end walls forming a first opening for a first shaft when the edges of the first and second cover components are abutted; the bodies of the third and fourth cover components forming a second cylindrical shape and the associated end walls forming a second opening for a second shaft when the edges of the third and fourth cover components are abutted; the first cylindrical shape being sized to telescopingly slidingly fit over an outer surface of the second cylindrical shape in order to enclose the coupling joint and associated portions of the first and second shafts wherein the edges include lateral flanges.

2. The guard defined in claim 1, wherein the lateral flanges of the first and second cover components define inwardly-open longitudinal slots for telescopingly slidingly receiving the lateral flanges of the third and fourth covers to thus allow for longitudinal length adjustment of the guard.

3. The guard defined in claim 1, wherein the lateral flanges of the first, second, third, and fourth cover components have different overlapping portions depending on a longitudinally adjusted position.

4. The guard defined in claim 1, including at least one fastener extended through overlapped portions of the lateral flanges to fix an adjusted length of the guard.

5. The guard defined in claim 1, including a pair of spaced stands defining an upwardly-facing concave shape that matingly receives associated ones of the cover components.

6. The guard defined in claim 5, wherein the stands each include a main support and an adjustable bracket that adjustably engages the main support to provide an adjustable height.

7. The guard defined in claim 6, including at least one fastener that connects the main support to the adjustable bracket to fix the adjustable height.

8. The guard defined in claim 5, wherein the cover components and the stands both include members thermoformed from heated flat sheets, the flat sheets having a relatively constant original wall thickness and the thermoformed members having a relatively consistent formed wall thickness.

\* \* \* \* \*